United States Patent
Sun et al.

(10) Patent No.: US 12,375,883 B2
(45) Date of Patent: Jul. 29, 2025

(54) INITIAL ACCESS ENHANCEMENTS FOR FIXED POINT-TO-MULTIPOINT MILLIMETER-WAVE WIRELESS COMMUNICATION NETWORKS

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 17/350,892

(22) Filed: Jun. 17, 2021

(65) Prior Publication Data

US 2022/0408224 A1    Dec. 22, 2022

(51) Int. Cl.
*H04W 4/06* (2009.01)
*H04L 5/00* (2006.01)
(Continued)

(52) U.S. Cl.
CPC ............ *H04W 4/06* (2013.01); *H04L 5/0048* (2013.01); *H04L 12/189* (2013.01); *H04W 72/30* (2023.01); *H04W 76/12* (2018.02)

(58) Field of Classification Search
CPC ...... H04L 5/0048; H04L 12/189; H04W 4/06; H04W 48/12; H04W 56/0015; H04W 72/30; H04W 76/12
See application file for complete search history.

(56) References Cited

U.S. PATENT DOCUMENTS

2018/0241494 A1\* 8/2018 Chendamarai Kannan ................. H04J 11/0073
2018/0279237 A1\* 9/2018 Kim .................... H04L 27/2613
(Continued)

FOREIGN PATENT DOCUMENTS

WO         2018232090 A1    12/2018
WO    WO-2019174586 A1 \*  9/2019

OTHER PUBLICATIONS

Pang, "Random Access Method and Device," English Machine Translation of Pang(WO 2019/174586 A1), Clarivate Analytics, pp. 1-21 (Year: 2023).\*

(Continued)

*Primary Examiner* — Marcus Smith
*Assistant Examiner* — Kai Chang
(74) *Attorney, Agent, or Firm* — Arent Fox, LLP

(57) ABSTRACT

Example aspects include a method, apparatus, and computer-readable medium for wireless communication at a network node of a fixed point-to-multipoint (PTMP) millimeter-wave (mmW) wireless communication network, comprising transmitting a first set of synchronization signal block (SSB) signals configured to establish a connection to the network with a user equipment (UE). The aspects further include establishing the connection to the network with the UE using information comprised by a SSB signal of the first set of SSB signals received by the UE. Other example aspects include a method, apparatus, and computer-readable medium for wireless communication at the UE of the network, comprising receiving at least one SSB signal of a first set of SSB signals configured to establish a connection to the network with a network node. The aspects further include establishing the connection to the network with the network node using information comprised by the at least one SSB signal.

16 Claims, 12 Drawing Sheets

(51) Int. Cl.
*H04L 12/18* (2006.01)
*H04W 72/30* (2023.01)
*H04W 76/12* (2018.01)

(56) References Cited

U.S. PATENT DOCUMENTS

| | | | |
|---|---|---|---|
| 2019/0313260 A1* | 10/2019 | Zhang | H04W 16/26 |
| 2020/0100290 A1 | 3/2020 | Mundarath et al. | |
| 2020/0112978 A1* | 4/2020 | Zhang | H04W 16/14 |
| 2020/0229002 A1* | 7/2020 | Kaikkonen | H04W 56/001 |
| 2021/0036833 A1* | 2/2021 | Yang | H04L 5/0057 |
| 2021/0119697 A1 | 4/2021 | Wang et al. | |
| 2021/0212007 A1* | 7/2021 | Liu | H04W 56/0015 |
| 2021/0227417 A1* | 7/2021 | Wang | H04W 24/10 |
| 2021/0258064 A1* | 8/2021 | Yu | H04B 7/086 |
| 2021/0282187 A1* | 9/2021 | Agiwal | H04W 72/23 |
| 2021/0297959 A1* | 9/2021 | Zhou | H04W 72/0453 |
| 2021/0329574 A1* | 10/2021 | Ang | H04L 5/0037 |
| 2022/0046724 A1* | 2/2022 | Maso | H04W 74/0841 |
| 2022/0182954 A1* | 6/2022 | Kumar | H04W 56/0005 |
| 2022/0225248 A1* | 7/2022 | Landis | H04L 5/0094 |
| 2022/0312157 A1* | 9/2022 | Wang | H04W 72/1263 |
| 2022/0394575 A1* | 12/2022 | Wang | H04W 36/0085 |
| 2023/0224113 A1* | 7/2023 | Xu | H04L 5/0051 370/336 |
| 2023/0308371 A1* | 9/2023 | Lunardi | H04L 43/0817 |

OTHER PUBLICATIONS

International Search Report and Written Opinion—PCT/US2022/072905—ISA/EPO—Oct. 5, 2022.

* cited by examiner

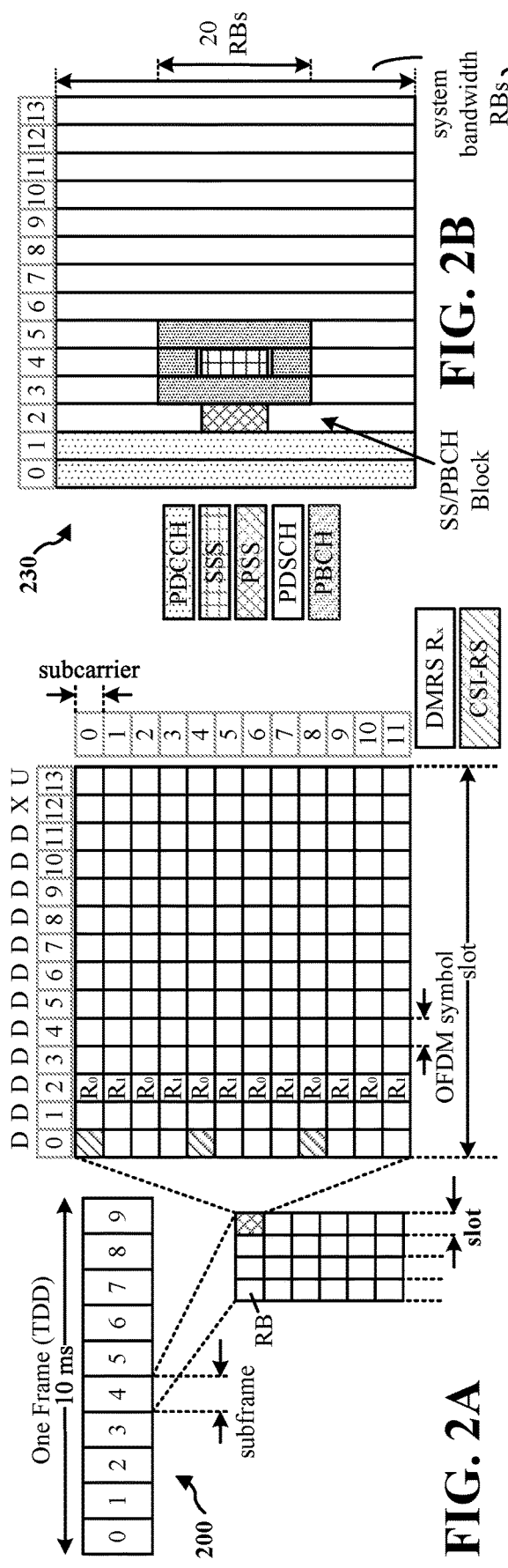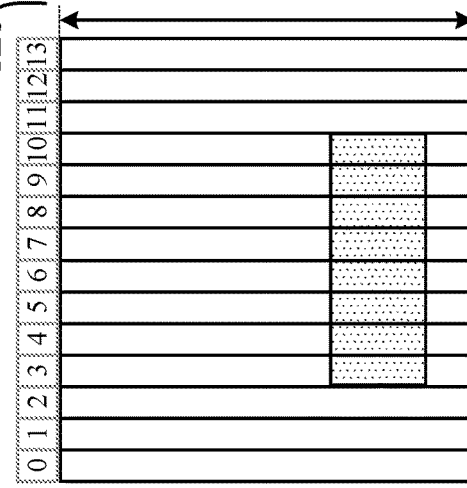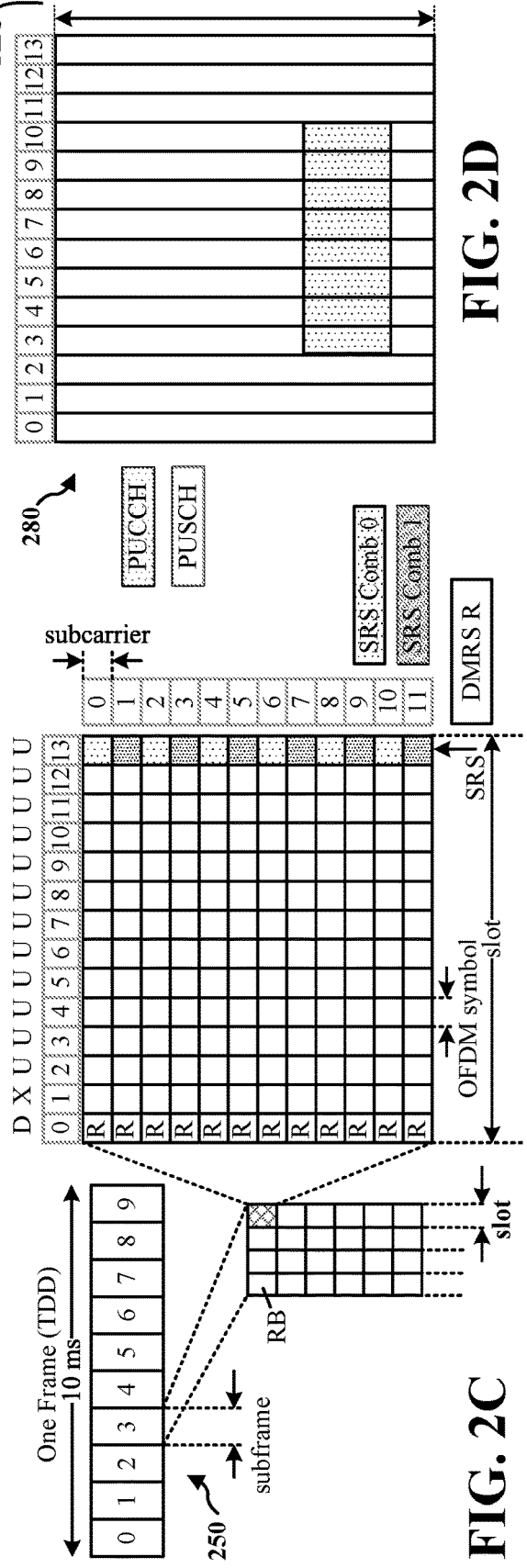

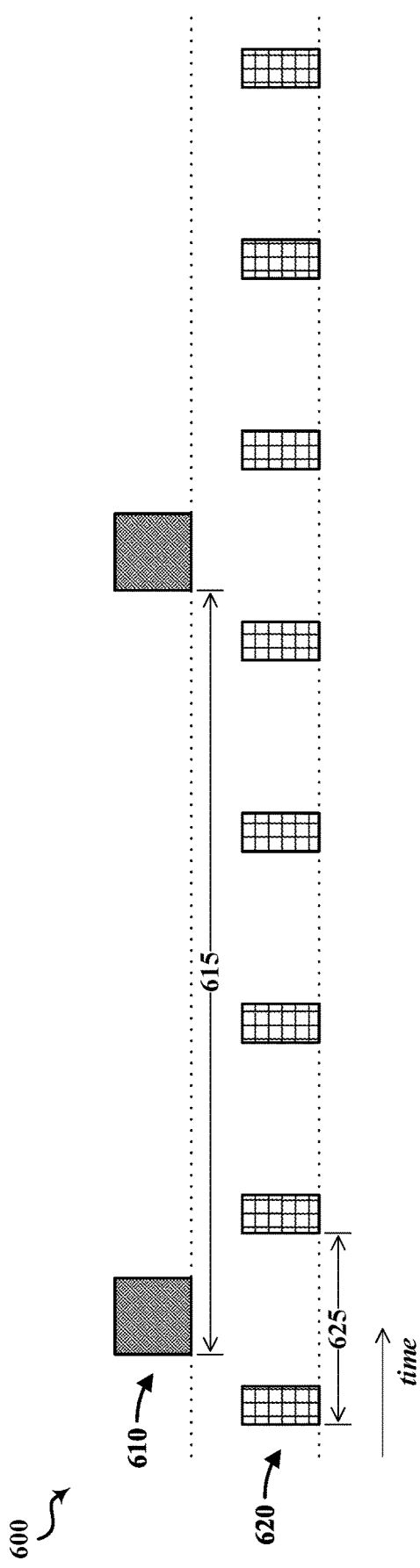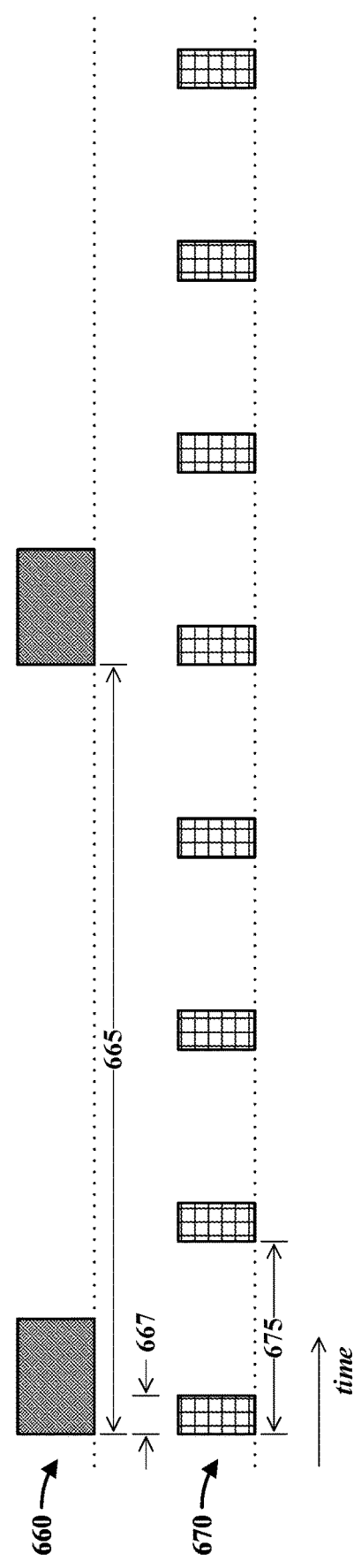
FIG. 6A
FIG. 6B

INITIAL ACCESS ENHANCEMENTS FOR FIXED POINT-TO-MULTIPOINT MILLIMETER-WAVE WIRELESS COMMUNICATION NETWORKS

BACKGROUND

Technical Field

The described aspects relate generally to wireless communication systems, and more particularly, to apparatuses and methods for initial access enhancements for fixed point-to-multipoint (PTMP) millimeter-wave (mmW) wireless communication networks.

Introduction

Wireless communication systems are widely deployed to provide various telecommunication services such as telephony, video, data, messaging, and broadcasts. Conventional wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication systems operating in a mmW operating frequency band may implement a fixed PTMP topology. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

An example aspect includes a method of wireless communication by a network node of a fixed point-to-multipoint (PTMP) millimeter-wave (mmW) wireless communication network, comprising transmitting a first set of synchronization signal block (SSB) signals configured to establish a connection to the network with a user equipment (UE). The method further includes establishing the connection to the network with the UE using information comprised by a SSB signal of the first set of SSB signals received by the UE.

Another example aspect includes an apparatus for wireless communication by a network node of a fixed PTMP mmW wireless communication network, comprising a memory storing instructions and a processor communicatively coupled with the memory. The processor is configured to execute the instructions to transmit a first set of SSB signals configured to establish a connection to the network with a UE. The processor is further configured to execute the instructions to establish the connection to the network with the UE using information comprised by a SSB signal of the first set of SSB signals received by the UE.

Another example aspect includes an apparatus for wireless communication by a network node of a fixed PTMP mmW wireless communication network, comprising means for transmitting a first set of SSB signals configured to establish a connection to the network with a UE. The apparatus further includes means for establishing the connection to the network with the UE using information comprised by a SSB signal of the first set of SSB signals received by the UE.

Another example aspect includes a computer-readable medium (e.g., non-transitory computer-readable medium) storing instructions for wireless communication by a network node of a fixed PTMP mmW wireless communication network, executable by a processor, to transmit a first set of SSB signals configured to establish a connection to the network with a UE. The instructions are further executable to establish the connection to the network with the UE using information comprised by a SSB signal of the first set of SSB signals received by the UE.

Another example aspect includes a method of wireless communication by a UE of a fixed PTMP mmW wireless communication network, comprising receiving at least one SSB signal of a first set of SSB signals configured to establish a connection to the network with a network node. The method further includes establishing the connection to the network with the network node using information comprised by the at least one SSB signal.

Another example aspect includes an apparatus for wireless communication by a UE of a fixed PTMP mmW wireless communication network, comprising a memory storing instructions and a processor communicatively coupled with the memory. The processor is configured to execute the instructions to receive at least one SSB signal of a first set of SSB signals configured to establish a connection to the network with a network node. The processor is further configured to execute the instructions to establish the connection to the network with the network node using information comprised by the at least one SSB signal.

Another example aspect includes an apparatus for wireless communication by a UE of a fixed PTMP mmW wireless communication network, comprising means for receiving at least one SSB signal of a first set of SSB signals configured to establish a connection to the network with a network node. The apparatus further includes means for establishing the connection to the network with the network node using information comprised by the at least one SSB signal.

Another example aspect includes a computer-readable medium (e.g., non-transitory computer-readable medium) storing instructions for wireless communication by a UE of a fixed PTMP mmW wireless communication network, executable by a processor, to receive at least one SSB signal of a first set of SSB signals configured to establish a connection to the network with a network node. The instructions are further executable to establish the connection to the network with the network node using information comprised by the at least one SSB signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIG. 6A is a diagram illustrating a first example of multiple SSB sweeping patterns, in accordance with various aspects of the present disclosure.

FIG. 6B is a diagram illustrating a second example of multiple SSB sweeping patterns, in accordance with various aspects of the present disclosure.

DETAILED DESCRIPTION

Figure 1:
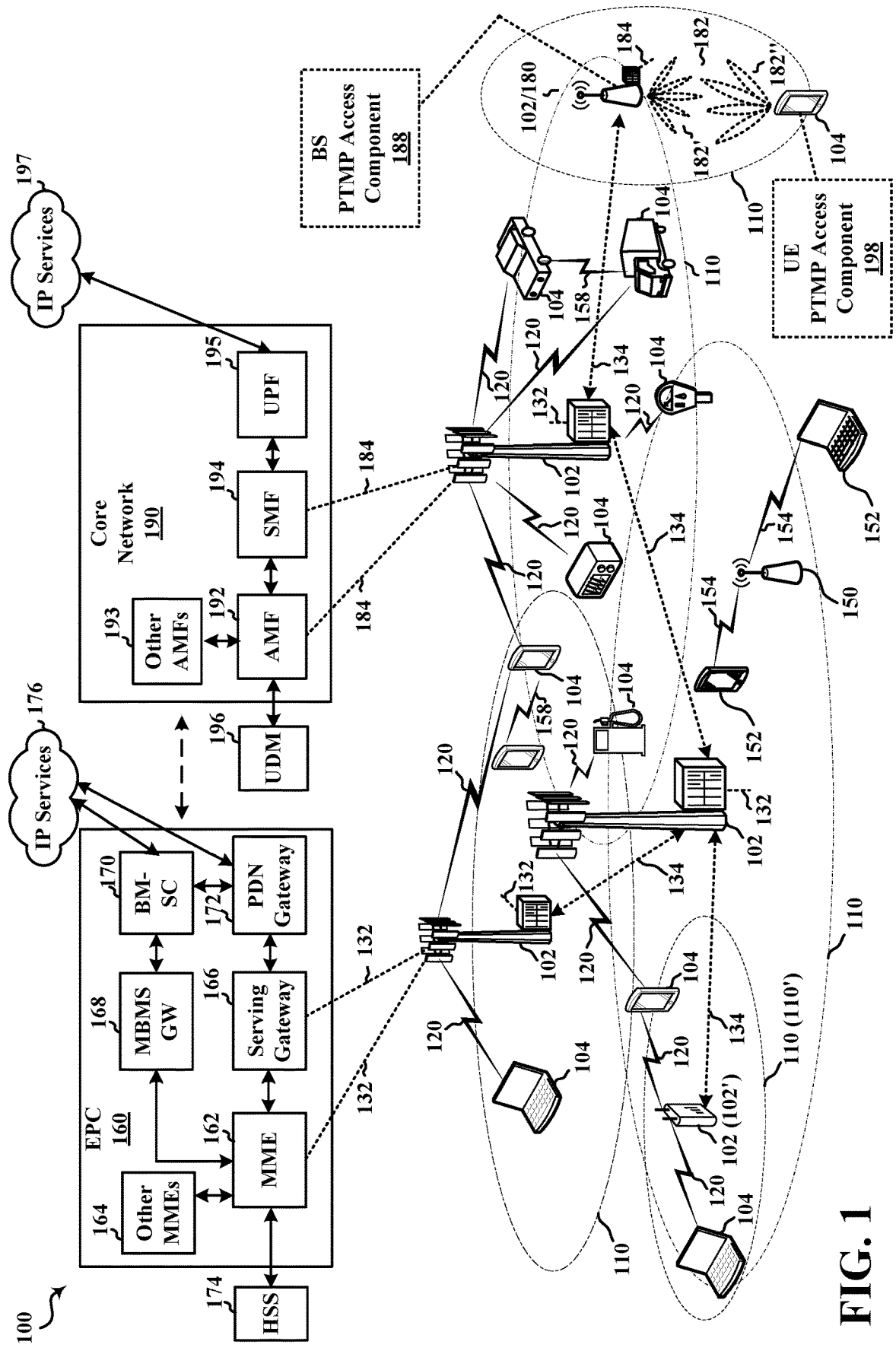
FIG. 1 is a diagram illustrating an example of a wireless communication system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communication systems operating in a millimeter wave (mmW) frequency band (e.g., FR2X (52.6 GHz-71 GHz), FR4 (71 GHz-114.25 GHz)) may deploy network nodes (e.g., base stations) configured to implement a fixed point-to-point (PTP) topology and/or a fixed point-to-multipoint (PTMP) topology. For example, the network nodes may provide communication coverage for a limited number of wireless communication devices (customer premises equipment (CPE), user equipment (UE)). Alternatively or additionally, the one or more wireless communication devices may have no mobility (e.g., fixed location) or low-mobility. However, in some aspects, the network nodes may be unable to provide communication coverage to the entire coverage area of the network node in a timely manner.

Aspects presented herein provide for multiple manners for performing wireless communications in a fixed PTMP mmW wireless communication network. In some aspects, a network node may transmit synchronization signal block (SSB) signals that may allow wireless communication devices an opportunity to synchronize with the network. Further, aspects presented herein may increase efficiency of the wireless communication system, when compared to a conventional communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In some aspects, the base station 102 may include a base station (BS) point-to-multipoint (PTMP) access component 188. The BS PTMP access component 188 may be configured to establish and maintain connections of a fixed PTMP millimeter-wave (mmW) wireless communication network. For example, the BS PTMP access component 188 may transmit a first set of synchronization signal block (SSB) signals, and establishing a connection to the network 100 with a UE 104 using information comprised by a SSB signal of the first set of SSB signals received by the UE 104.

Similarly, the UE 104 may include a UE PTMP access component 198. The UE PTMP access component 198 may be configured to establish and maintain connections of a fixed PTMP mmW wireless communication network. For example, the UE PTMP access component 198 may receive at least one SSB signal of a first set of SSB signals, and establishing a connection to the network 100 with the base station 102 using information comprised by the at least one SSB signal.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunication System (UMTS) Terrestrial Radio Access Network (E-UTRAN)) may interface with the EPC 160 through first backhaul links 132 (e.g., S1 interface), which may be wired or wireless. The base stations 102 configured for 5GNR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communication systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (186 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 to communicate with another UE 104, such as based on sidelink, V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through DCI, or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. In such an example, the slot duration may be 0.25 milliseconds, the subcarrier spacing may be 60 kHz, and the symbol duration may be approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
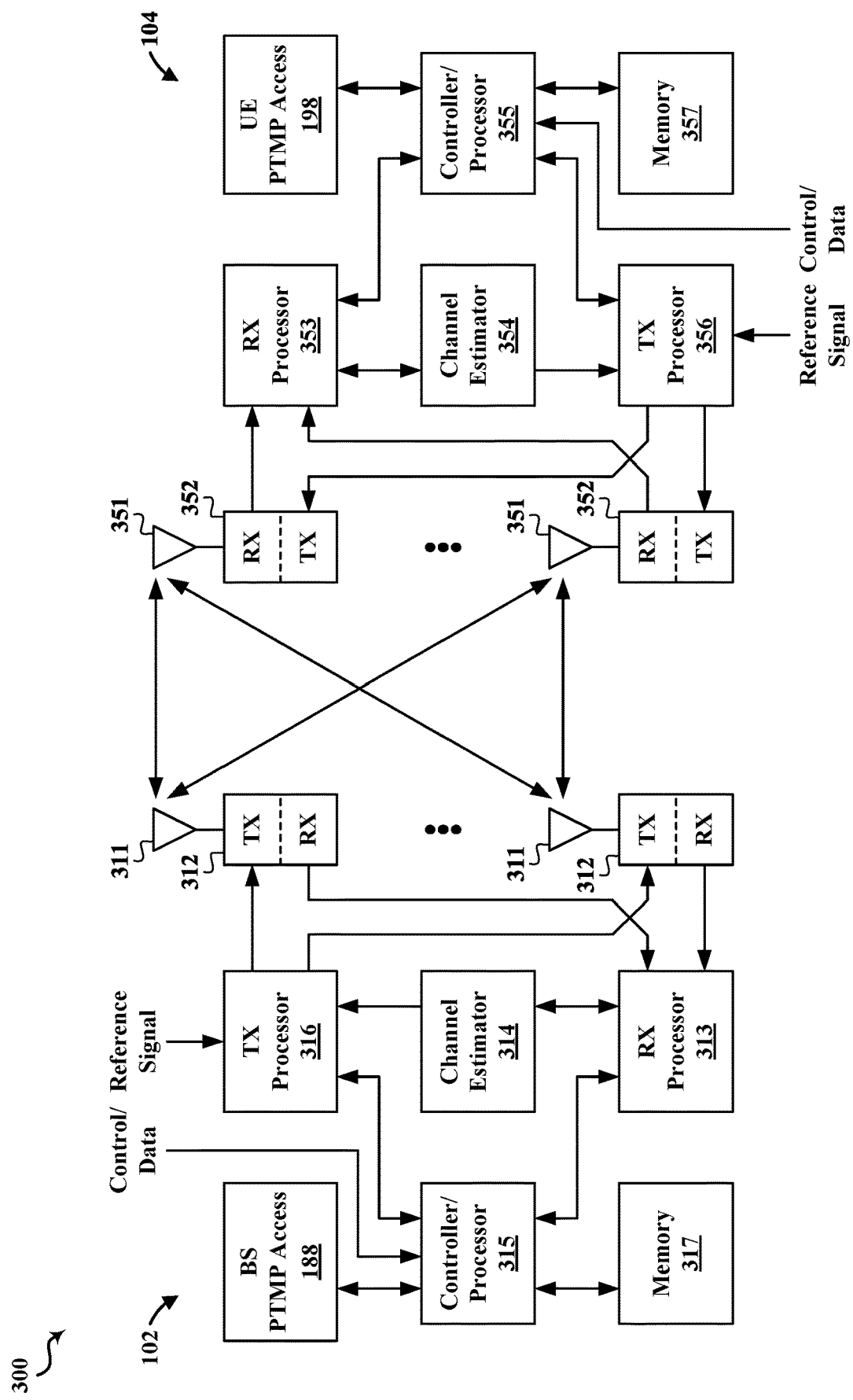
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in an access network. In the downlink, IP packets from the EPC 160 may be provided to a controller/processor 315. The controller/processor 315 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 315 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 313 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream may be spatially precoded to produce multiple spatial streams. Channel estimates from a channel estimator 314 may be used to determine the coding and modulation scheme, as well as for spatial processing. The channel estimate may be derived from a reference signal and/or channel condition feedback transmitted by the UE 104. Each spatial stream may then be provided to a different antenna 311 via a separate transmitter 312TX. Each transmitter 312TX may modulate an RF carrier with a respective spatial stream for transmission.

At the UE 104, each receiver 352RX may receive a signal through its respective antenna 351. Each receiver 352RX may recover information modulated onto an RF carrier and may provide the information to the receive (RX) processor 353. The TX processor 356 and the RX processor 353 may implement Layer 1 functionality associated with various signal processing functions. The RX processor 353 may perform spatial processing on the information to recover any spatial streams destined for the UE 104. If or when multiple spatial streams are destined for the UE 104, the multiple spatial streams may be combined by the RX processor 353 into a single OFDM symbol stream. The RX processor 353 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 354. The soft decisions may then be decoded and deinterleaved to recover the data and control signals that were originally transmitted by the base station 102 on the physical channel. The data and control signals may then be provided to the controller/processor 355, which may implement Layer 3 and Layer 2 functionality.

The controller/processor 355 can be associated with a memory 357 that stores program codes and data. The memory 357 may be referred to as a non-transitory computer-readable medium. The controller/processor 355 may provide demultiplexing between transport and logical channels, packet reassembly, deciphering, header decompression, and control signal processing to recover IP packets from the EPC 160. The controller/processor 355 is also responsible for error detection using an acknowledge (ACK) and/or negative acknowledge (NACK) protocol to support HARQ operations.

Similar to the functionality described in connection with the transmission by base station 102, the controller/processor 355 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 354 from a reference signal or feedback transmitted by the base station 102 may be used by the TX processor 356 to select the appropriate coding and modulation schemes, and to facilitate spatial processing. The spatial streams generated by the TX processor 356 may be provided to different antenna 351 via separate transmitters 352TX. Each transmitter 352TX may modulate an RF carrier with a respective spatial stream for transmission.

The uplink transmission may be processed at the base station 102 in a manner similar to that described in connection with the receiver function at the UE 104. Each receiver 312RX may receive a signal through its respective antenna 311. Each receiver 312RX may recover information modulated onto an RF carrier and may provide the information to a RX processor 313.

The controller/processor 315 may be associated with, and coupled with, a memory 317 that stores program codes and data. The memory 317 may be referred to as a non-transitory computer-readable medium. The controller/processor 315 may provide demultiplexing between transport and logical channels, packet reassembly, deciphering, header decompression, control signal processing to recover IP packets from the UE 104. IP packets from the controller/processor 315 may be provided to the EPC 160. The controller/processor 315 may also be responsible for error detection using an ACK and/or NACK protocol to support HARQ operations.

In some aspects, the base station 102 may include a BS PTMP access component 188. The BS PTMP access component 188 may be configured to establish and maintain connections of a fixed PTMP mmW wireless communication network. For example, the BS PTMP access component 188 may transmit a first set of SSB signals, and establish a connection to the network 100 with the UE 104 using information comprised by a SSB signal of the first set of SSB signals received by the UE 104.

In other aspects, at least one of the TX processor 316, the RX processor 313, and the controller/processor 315 may be configured to perform aspects in connection with the BS PTMP access component 188 of FIG. 1. For example, the memory 317 may store computer-executable instructions defining the BS PTMP access component 188. In other aspects, the TX processor 316, the RX processor 313, and/or the controller/processor 315 may be configured to execute the BS PTMP access component 188.

In some aspects, the UE 104 may include a UE PTMP access component 198. The UE PTMP access component 198 may be configured to establish and maintain connections of a fixed PTMP mmW wireless communication network. For example, the UE PTMP access component 198 may receive at least one SSB signal of a first set of SSB signals, and establish the connection to the network 100 with the base station 102 using information comprised by the at least one SSB signal.

In other aspects, at least one of the TX processor 356, the RX processor 353, and the controller/processor 355 may be configured to perform aspects in connection with the UE PTMP access component 198 of FIG. 1. For example, the memory 357 may store computer-executable instructions defining the UE PTMP access component 198. In other aspects, the TX processor 356, the RX processor 353, and/or the controller/processor 355 may be configured to execute the UE PTMP access component 198.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
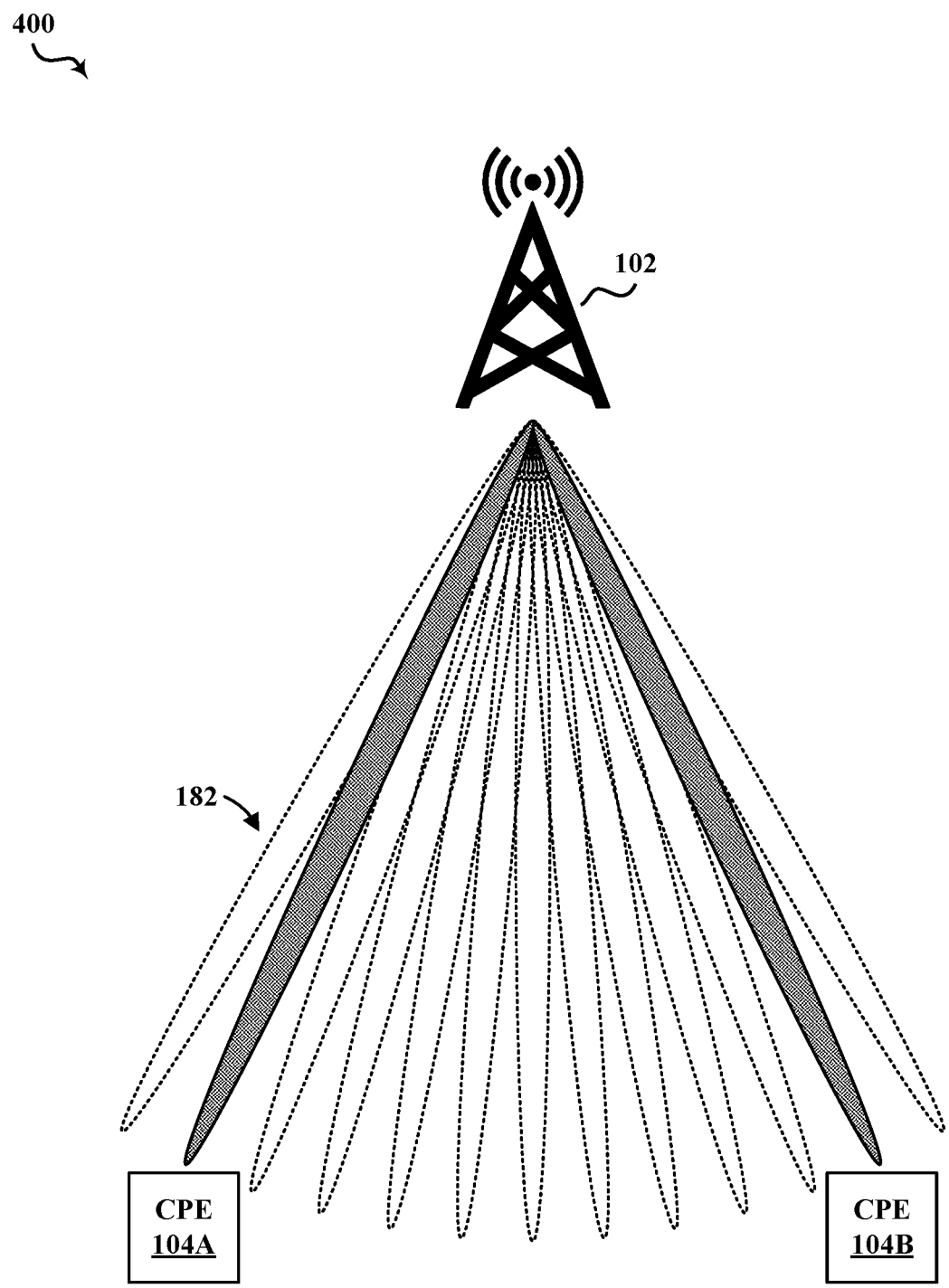
FIG. 4 is a diagram illustrating an example of fixed point-to-multipoint (PTMP) millimeter-wave (mmW) wireless communication system, in accordance with various aspects of the present disclosure.

FIG. 4 is a diagram illustrating an example of a fixed point-to-multipoint (PTMP) millimeter-wave (mmW) wireless communication system 400. The fixed PTMP mmW wireless communication system 400 may comprise a network node 102 and customer premises equipment (CPE) 104A-104B (hereinafter "104"). The architecture of the system depicted in FIG. 4 may be similar in many respects to the architecture of the wireless communication system 100 described above with reference to FIG. 1 and may include additional features not mentioned above. Some of the elements of the wireless communication system 100 described above have been omitted for the sake of simplicity.

The network node 102 depicted in FIG. 4 may be similar in many respects to the network devices (e.g., base station 102, gNB 180) described above in reference to FIGS. 1 and 3, and may include additional features not mentioned above. The network node 102 may comprise a BS PTMP access component 188 (shown in FIG. 1). The CPEs 104 depicted in FIG. 4 may be similar in many respects to the UE 104 described above in reference to FIGS. 1 and 3, and may include additional features not mentioned above. The CPEs 104 may comprise a UE PTMP access component 198 (shown in FIG. 1).

In some aspects, the network node 102 may be configured to operate in a millimeter wave frequency band (e.g., FR2X (52.6 GHz-71 GHz), FR4 (71 GHz-114.25 GHz)). The network node 102 may be further configured to implement a fixed point-to-point (PTP) topology and/or a fixed point-to-multipoint (PTMP) topology. For example, the network node 102 may be configured to establish and maintain connections with one or more CPEs 104. The CPEs 104 may be fixed (e.g., no mobility) devices and/or low-mobility devices. That is, the CPEs 104 may be located (or placed) at a fixed location that may be relatively large distance away from the network node 102. For example, the CPEs 104 may be located near an edge of a coverage area of the network node 102. Alternatively or additionally, the CPEs 104 may be deployed by a network operator of the system 400. As a result, the system 400 may be designed to prioritize coverage area over flexibility and/or mobility of the CPEs 104.

That is, the system 400 may be configured to provide communication coverage to a relatively small number of low or no mobility CPEs 104, when compared with a conventional wireless communication system. For example, the system 400 may be configured to only provide communication coverage to a set of CPEs 104 deployed at selected locations.

In other aspects, the network node 102 may be configured with a relatively high maximum equivalent isotropic radiated power (EIRP) in relation to an antenna gain of the network node 102. For example, the maximum EIRP may be set at 85 dBm for a network node 102 having an antenna gain that may exceed 55 dB. Alternatively or additionally, the maximum EIRP may increase with the operating frequency band of the network node 102. For example, a maximum EIRP for the FR4 operating frequency band may be higher than a maximum EIRP for the FR2X operating frequency band. As such, the network node 102 may utilize beamforming to generate narrow beams 182 that may achieve the configured antenna gain and/or maximum EIRP. That is, a large number of the narrow beams 182 may be needed to provide communication coverage to the coverage area (e.g., cell) of the network node 102.

In some aspects, the network node 102 may be configured to periodically transmit synchronization signal block (SSB) signals that may allow the CPEs 104 an opportunity to synchronize with the system 400. By synchronizing with the system 400, the CPEs 104 may establish and/or maintain a connection with the system 400. The network node 102 may repeatedly transmit, for each period cycle (e.g., 20 milliseconds (msec)), a number of SSB signals in a number of corresponding directions. The network node 102 may transmit the SSB signals using the beams 182. That is, the network node 102 may transmit the SSB signals in a direction corresponding to the respective beams 182. However, the network node 102 may be limited in the number of SSB signals, and the corresponding directions of the SSBs, that may be transmitted within a particular time period. That is, the network node 102 may not be able to transmit SSB signals to the coverage area of the network node 102 within a single time period. As such, the network node 102 may not transmit sufficient SSB signals to provide coverage to the coverage area of the network node 102 in a timely manner. Thus, there exists a need for further improvements in 5G NR technology.

Aspects presented herein provide for the system 400 to perform on-demand SSB sweeping rather than periodically transmitting the SSB signals. That is, the system 400 may only transmit SSB bursts when triggered by an event. In some aspects, the system 400 may transmit a set of SSB signals in response to a CPE 104 being deployed on the network. The set of SSB signals may be configured to establish connections to the system 400. For example, a network operator may enable and/or activate SSB sweeping if or when a new CPE 104 is deployed on the system 400.

Figure 5:
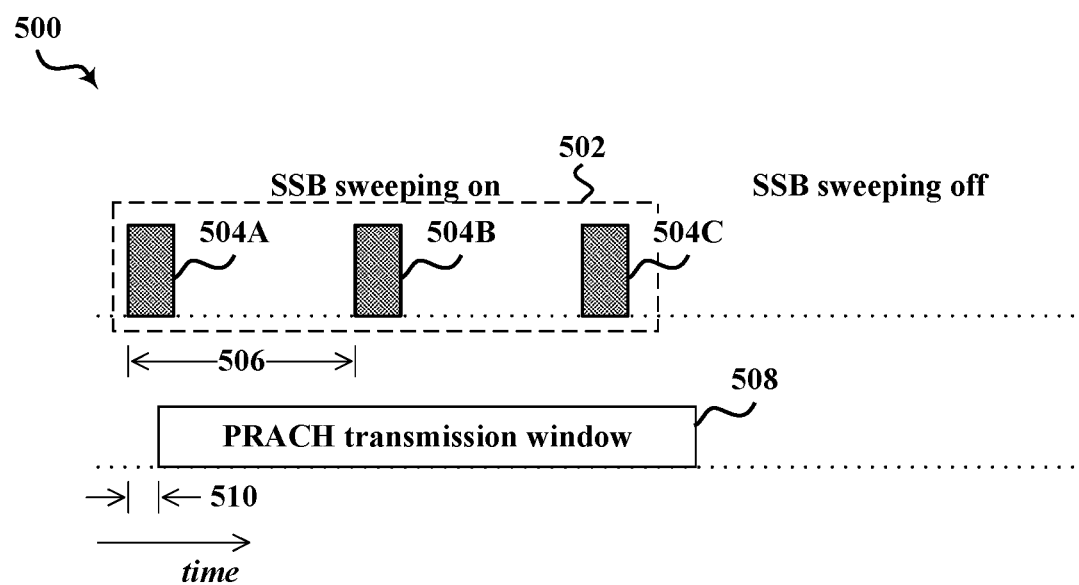
FIG. 5 is a diagram illustrating an example of on-demand synchronization signal block (SSB) sweeping, in accordance with various aspects of the present disclosure.

FIG. 5 illustrates a diagram 500 of an example of on-demand SSB sweeping. For example, the network node 102 may transmit one or more SSB bursts (e.g., 504A-C, hereinafter "504") during a time period 502 in which SSB sweeping is enabled and/or active. Each SSB burst 504 may comprise one or more SSB signals transmitted in one or more directions. In some aspects, each SSB burst 504 may be configured to provide full coverage to the coverage area of the network node 102. That is, each SSB burst 504 may transmit sufficient SSB signals to provide SSB coverage to all locations in a cell of the network node 102. Alternatively or additionally, the SSB bursts 504 may be transmitted using a sweeping pattern with a certain periodicity. In some examples, the on-demand SSB sweeping period 506 may be longer than a sweeping period for a conventional wireless communication system (e.g., greater than 20 msec).

In other optional or additional aspects, the CPE 104 may receive at least one SSB signal from at least one SSB burst 504. The CPE 104 may synchronize to the system 400 using information comprised by the received SSB signal. Alternatively or additionally, the CPE 104 may establish an initial connection to the system 400 (e.g., network node 102) using the information comprised by the received SSB signal.

In other optional or additional aspects, the network node 102 may disable and/or deactivate the SSB sweeping in response to establishing the connection with the CPE 104. That is, the network node 102 may stop transmitting the SSB bursts 504 subsequent to establishing the connection with CPE 104.

In other optional or additional aspects, the CPE 104, if or when the CPE 104 is connected with the network node 102, may stop monitoring for SSB signals. Alternatively or additionally, the CPE 104 may maintain the connection with the network node 102 using a channel state information reference signal (CSI-RS) for radio link monitoring (RLM) and/or radio resource management (RRM).

It may be understood that the on-demand SSB sweeping example illustrated in FIG. 5 is only one example of on-demand SSB sweeping that may be utilized without departing from the scope described herein. For example, other amounts of SSB bursts may be transmitted by the network node 102. In another example, the SSB bursts may not be transmitted with a particular periodicity.

Continuing to refer to FIG. 5, the network node 102 may transmit remaining minimum system information (RMSI) blocks (e.g., system information block 1 (SIB1)) during the on-demand SSB sweeping window 502. The RMSI blocks may indicate one or more physical random access channel (PRACH) RACH occasions (ROs) during which the CPE 104 may transmit one or more transmissions to the network node 102 via the PRACH. The PRACH configuration indicated by the RMSI blocks may be similar and/or the same as a conventional PRACH configuration for a conventional wireless communication system. Alternatively or additionally, the PRACH configuration indicated by the RMSI blocks may indicate a validity time period for the PRACH ROs. That is, the PRACH transmission window 508 may be valid within a time period according to the on-demand SSB sweeping window 502. In some aspects, an offset 510 between the on-demand SSB sweeping window 502 and the PRACH transmission window 508 may be configurable and/or may be indicated by the PRACH configuration in the RMSI blocks. As such, the CPE 104 may transmit one or more transmissions to the network node 102 via the PRACH if or when the CPE 104 receives and/or measures the SSB signal within the PRACH transmission window 508. For example, the one or more transmissions may comprise a request to establish an initial connection with the network node 102. Alternatively or additionally, the one or more transmissions may be transmitted during an RO corresponding to the SSB signal received by the CPE 104. In other aspects, the network node 102 may stop monitoring for transmissions via the PRACH after the PRACH transmission window 508 has elapsed.

Advantageously, aspects presented herein allow for transmission of SSB bursts, on an on-demand basis, that provide SSB coverage to all locations in a cell of the network node 102 that a newly-deployed CPE 104 may receive to establish an initial connection with the network 102.

FIGS. 6A and 6B illustrate diagrams 600 and 650 of two examples of multiple SSB sweeping patterns with different cycles (e.g., period lengths). For example, the network node 102 may transmit a first set of SSB signals in a first SSB sweeping pattern (e.g., 610, 660) and a second set of SSB signals in a second SSB sweeping pattern (e.g., 620, 670). The first SSB sweeping pattern may be transmitted at a low duty cycle and the second SSB sweeping pattern may be transmitted at a high duty cycle. That is, a period length corresponding to the first SSB sweeping pattern (e.g., 615, 665) may be longer than a period length corresponding to the second SSB sweeping pattern (e.g., 625, 675).

In some aspects, the first set of SSB signals 610, 660 may be configured to provide SSB coverage to the cell of the network node 102. That is, the first set of SSB signals 610, 660 may provide coverage to the coverage area of the network node 102. Alternatively or additionally, the first set of SSB signals 610, 660 may be configured to establish an initial connection between a CPE 104 (or UE 104) and the network node 102. That is, the CPE 104 may synchronize to the system 400 using information comprised by the received SSB signal from the first set of SSB signals 610, 660 and establish an initial connection to the network node 102 using the information comprised by the received SSB signal. In other aspects, the network node 102 may transmit RMSI blocks corresponding to the first set of SSB signals 610, 660. Alternatively or additionally, the network node 102 may allocate PRACH resources corresponding to the first set of SSB signals 610, 660 as described above in reference to FIG. 5. In other optional or additional aspects, the first set of SSB signals 610, 660 may be transmitted on an on-demand basis (e.g., triggered by a deployment event) as described above in reference to FIG. 5.

The second set of SSB signals 620, 670 may be configured to provide SSB coverage to a portion of the cell of the network node 102. That is, the second set of SSB signals 620, 670 may provide coverage to a subset coverage area of the network node 102. For example, the second set of SSB signals 620, 670 may be transmitted in one or more directions (e.g., beams) corresponding to a set of CPEs 104 (and/or UEs 104) connected to the network node 102. As such, the second set of SSB signals 620, 670 may only provide coverage to the set of CPEs 104 connected to the network node 102. That is, the coverage provided by the second set of SSB signals 620, 670 may depend on the location(s) of the CPEs 104 currently connected to the network node 102. In other aspects, the network node 102 may not transmit RMSI blocks corresponding to the second set of SSB signals 660, 670. Alternatively or additionally, the second set of SSB signals 660, 670 may provide configuration information to the CPEs 104 to maintain the corresponding connections with the network node 102 using RLM and/or RRM signaling, rather than CSI-RS. In other optional or additional aspects, the network node 102 may allocate PRACH resources corresponding to the second set of SSB signals 620, 670 as described above in reference to FIG. 5. For example, the PRACH resources may be used to allow the connected CPEs 104 to transmit scheduling requests (SRs).

In some aspects, the network node 102 may be configured to add a SSB signal corresponding to a CPE 104 to the second set of SSB signals 620, 670 in response to establishing a connection with the CPE 104. Alternatively or additionally, the network node 102 may be configured to remove the SSB signal corresponding to the CPE 104 from the second set of SSB signals 620, 670 in response to removing the connection with the CPE 104.

In other optional or additional aspects, the CPE 104 may be configured to monitor for the first set of SSB signals 610, 660 in order to establish an initial connection with the network node 102. Alternatively or additionally, the CPE 104 may be configured, in response to establishing the connection with the network node 102, to stop monitoring for the first set of SSB signals 610, 660 and to start monitoring for the second set of SSB signals 620, 670.

In some aspects, the first SSB sweeping pattern and the second SSB sweeping pattern may have separate transmission occasions, as shown in FIG. 6A. That is, transmissions of the first set of SSB signals 610 and transmissions of the second set of SSB signals 620 may not overlap in time.

In other optional or additional aspects, the start of a first sweep cycle of the first set of SSB signals 660 may overlap with a second start of a second sweep cycle of the second set of SSB signals 670, as shown in FIG. 6B. In such aspects, the second set of SSB signals 670 may be a subset of the first set of SSB signals 660. That is, an initial portion 667 of the first set of SSB signals 660, which overlaps in time with the second set of SSB signals 670, may comprise the same SSB signals as the second set of SSB signals 670. Alternatively or additionally, the remaining portion of the first set of SSB signals 660 may comprise one or more SSB signals configured to provide coverage to the remaining portion of the cell of the network node 102 not covered by the second set of SSB signals 670.

It may be understood that the multiple SSB sweeping patterns examples illustrated in FIGS. 6A and 6B are only two example of SSB sweeping patterns that may be utilized without departing from the scope described herein.

Advantageously, aspects presented herein allow for transmission of multiple SSB sweeping patterns, that provide SSB coverage for establishing connections to the network node 102, without the need for operator intervention, and provide SSB coverage with a higher duty cycle (e.g., lower latency) for devices connected to the network node 102.

Figure 7:
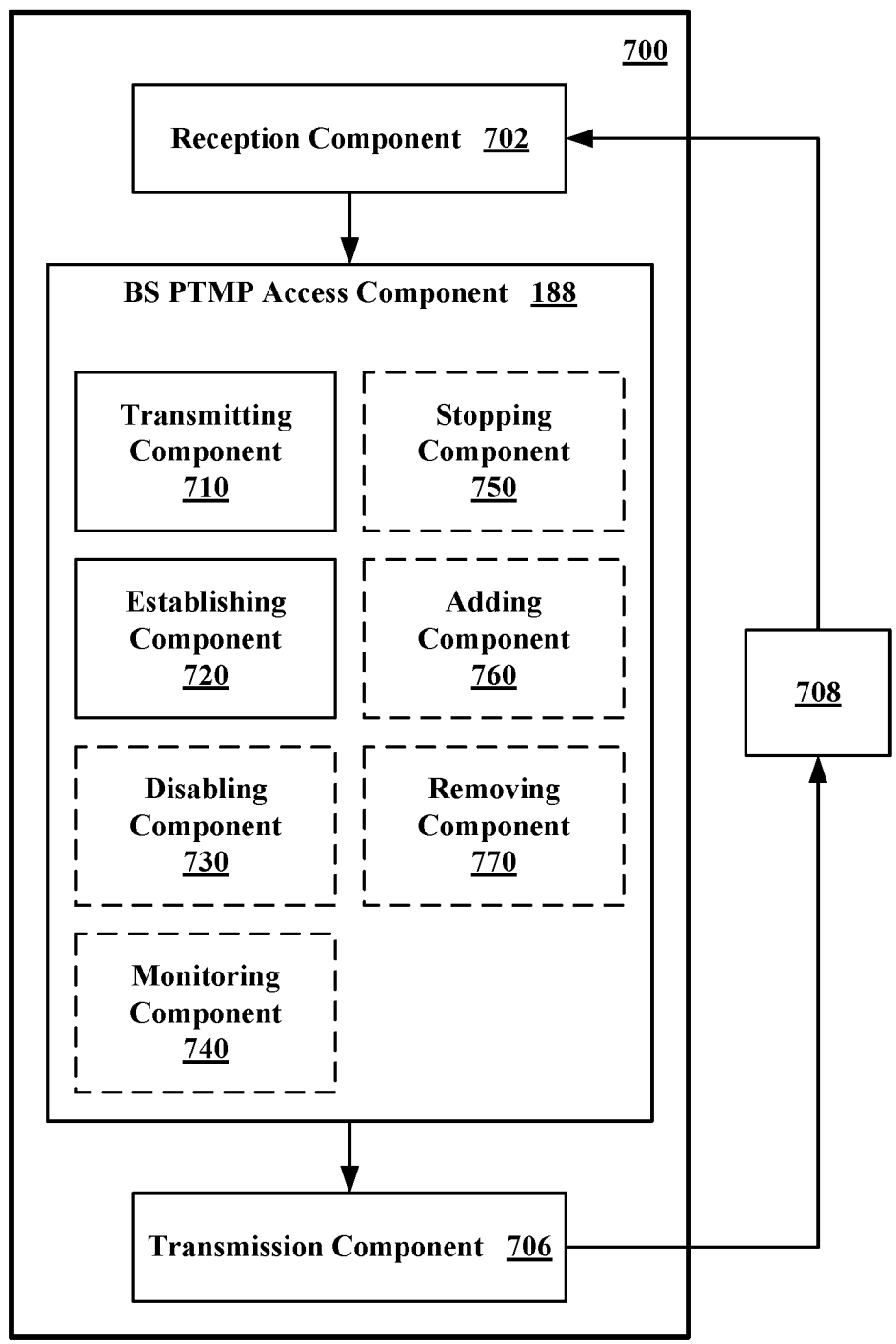
FIG. 7 is a diagram illustrating an example apparatus, such as a base station, for wireless communication in a fixed PTMP mmW wireless communication network, in accordance with various aspects of the present disclosure.

FIG. 7 is a block diagram of an example apparatus 700 for wireless communication in a fixed point-to-multipoint (PTMP) millimeter-wave (mmW) wireless communication network. The apparatus 700 may be a base station 102 (e.g., base station 102 of FIGS. 1 and 3) or a base station 102 may include the apparatus 700. In some aspects, the apparatus 700 may include a reception component 702 configured to receive wireless communications from another apparatus (e.g., apparatus 708), a BS PTMP access component 188 configured to establish and maintain connections of a fixed PTMP mmW wireless communication network, a transmission component 706 configured to transmit wireless communications to another apparatus (e.g., apparatus 708), and which may be in communication with one another (e.g., via buses or electrical connections). As shown, the apparatus 700 may be in communication with another apparatus 708 (such as a UE 104, or another wireless communication device) using the reception component 702 and the transmission component 706.

In some aspects, the apparatus 700 may be configured to perform one or more operations described herein in connection with FIGS. 1 and 3-6. Alternatively or additionally, the apparatus 700 may be configured to perform one or more processes described herein, such as method 800 of FIGS. 8-10. In some aspects, the apparatus 700 may include one or more components of the UE 104 described above in connection with FIGS. 1 and 3.

The reception component 702 may receive communications, such as reference signals, control information, data communications, or a combination thereof, from the apparatus 708. The reception component 702 may provide received communications to one or more other components of the apparatus 700, such as the BS PTMP access component 188. In some aspects, the reception component 702 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the base station 102 described above in connection with FIGS. 1 and 3.

The transmission component 706 may transmit communications, such as reference signals, control information, data communications, or a combination thereof, to the apparatus 708. In some aspects, the BS PTMP access component 188 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In other aspects, the transmission component 706 may include one or more antennas, a modulator, a transmit MIMO processor, a transmit processor, a controller/processor, a memory, or a combination thereof, of the base station 102 described above in connection with FIGS. 1 and 3. In some aspects, the transmission component 706 may be co-located with the reception component 702 in a transceiver or transceiver component.

The BS PTMP access component 188 may be configured to establish and maintain connections of a fixed PTMP mmW wireless communication network. In some aspects, the BS PTMP access component 188 may include a set of components, such as an transmitting component 710 configured to transmit a first set of SSB signals, and an establishing component 720 configured to establishing a connection to the network 100 with the apparatus 708 (e.g., UE 104) using information comprised by a SSB signal of the first set of SSB signals received by the apparatus 708.

In other optional or additional aspects, the BS PTMP access component 188 may include a disabling component 730 configured to disable transmitting of the first set of SSB signals, a monitoring component 740 configured to monitor a PRACH for a transmission from the apparatus 708, a stopping component 750 configured to stop monitoring the PRACH for the transmission from the apparatus 708, an adding component 760 configured to add a first SSB signal to the second set of SSB signals, and a removing component 770 configured to remove the first SSB signal from the second set of SSB signals.

Alternatively or additionally, the set of components may be separate and distinct from the BS PTMP access component 188. In other aspects, one or more components of the set of components may include or may be implemented within a controller/processor (e.g., the TX processor 316, the RX processor 313, the controller/processor 315), a memory (e.g., the memory 317), or a combination thereof, of the base station 102 described in FIGS. 1 and 3. Alternatively or additionally, one or more components of the set of components may be implemented at least in part as software stored in a memory, such as the memory 317. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIGS. 1 and 3.

Referring to FIGS. 7-10, in operation, an apparatus 700 may perform a method 800 of wireless communication at a network node. Alternatively or additionally, the method 800 may be performed by the base station 102 (which may include the memory 317 and which may be the entire base station 102 and/or one or more components of the base station 102 such as the BS PTMP access component 188, the TX processor 316, the RX processor 313, and/or the controller/processor 315). The method 800 may be performed by the BS PTMP access component 188 in communication with the apparatus 708 (e.g., UE 104).

Figure 8:
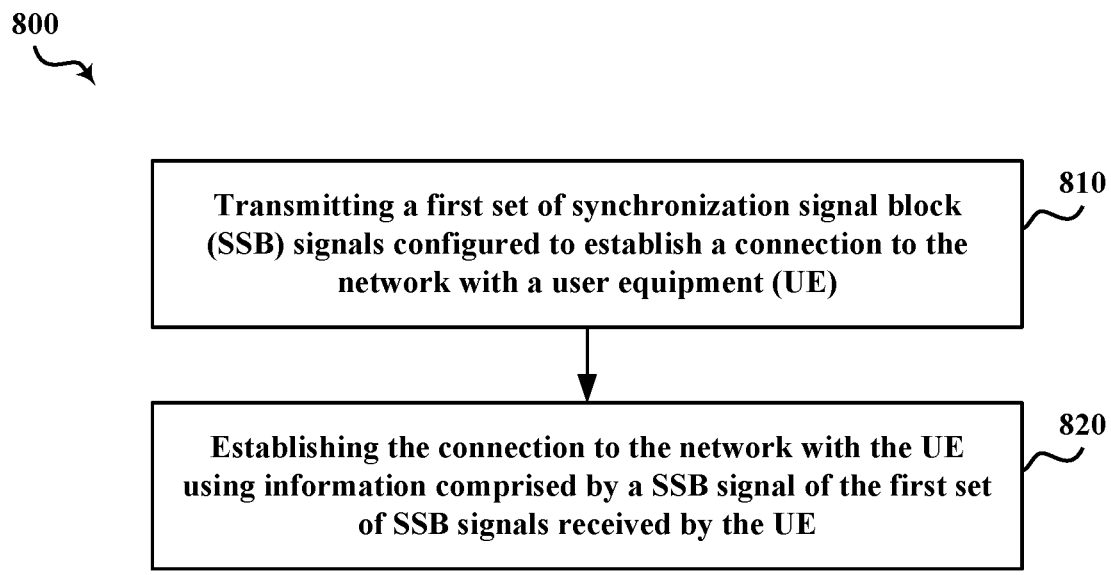
FIG. 8 is a flowchart of a method of wireless communication by a base station of a fixed PTMP mmW wireless communication network, in accordance with various aspects of the present disclosure.

At block 810 of FIG. 8, the method 800 includes transmitting a first set of SSB signals configured to establish a connection to the network with a user equipment (UE). For example, in an aspect, the base station 102, the BS PTMP access component 188, and/or the transmitting component 710 may be configured to or may comprise means for transmitting a first set of SSB signals configured to establish a connection to the network 100 with a UE 104.

For example, the transmitting at block 810 may include transmitting SSB bursts 504 using a pattern with a certain periodicity in response to an event, as described above in reference to FIG. 5. Alternatively or additionally, the transmitting at block 810 may include transmitting a first set of SSB signals 610, 660 using a low duty cycle, as described above in reference to FIG. 6.

In some aspects, the transmitting at block 810 may include transmitting RMSI blocks (e.g., SIB1) corresponding to the SSB signals, as described above in reference to FIGS. 5 and 6A-6B. For example, the RMSI blocks may indicate one or more RACH occasions (ROs) during which the UE 104 may transmit one or more transmissions to the base station 102 via the PRACH.

Further, for example, the transmitting at block 810 may be performed to provide for a UE 104 to establish an initial connection with the base station 102. The SSB signals may be transmitted in response to an event and/or using a low duty cycle, thus allowing for providing full SSB coverage of the coverage area of the base station 102.

At block 820 of FIG. 8, the method 800 includes establishing the connection to the network with the UE using information comprised by a SSB signal of the first set of SSB signals received by the UE. For example, in an aspect, the base station 102, the BS PTMP access component 188, and/or the establishing component 720 may be configured to or may comprise means for establishing the connection to the network with the UE using information comprised by a SSB signal of the first set of SSB signals received by the UE.

For example, the establishing at block 820 may include establishing a connection with the UE 104 using information comprised by a SSB signal of the first set of SSB signals received by the UE 104, as described above in reference to FIGS. 5 and 6A-6B.

Further, for example, the establishing at block 820 may be performed to establish an initial connection between the base station 102 and the UE 104.

Figure 9:
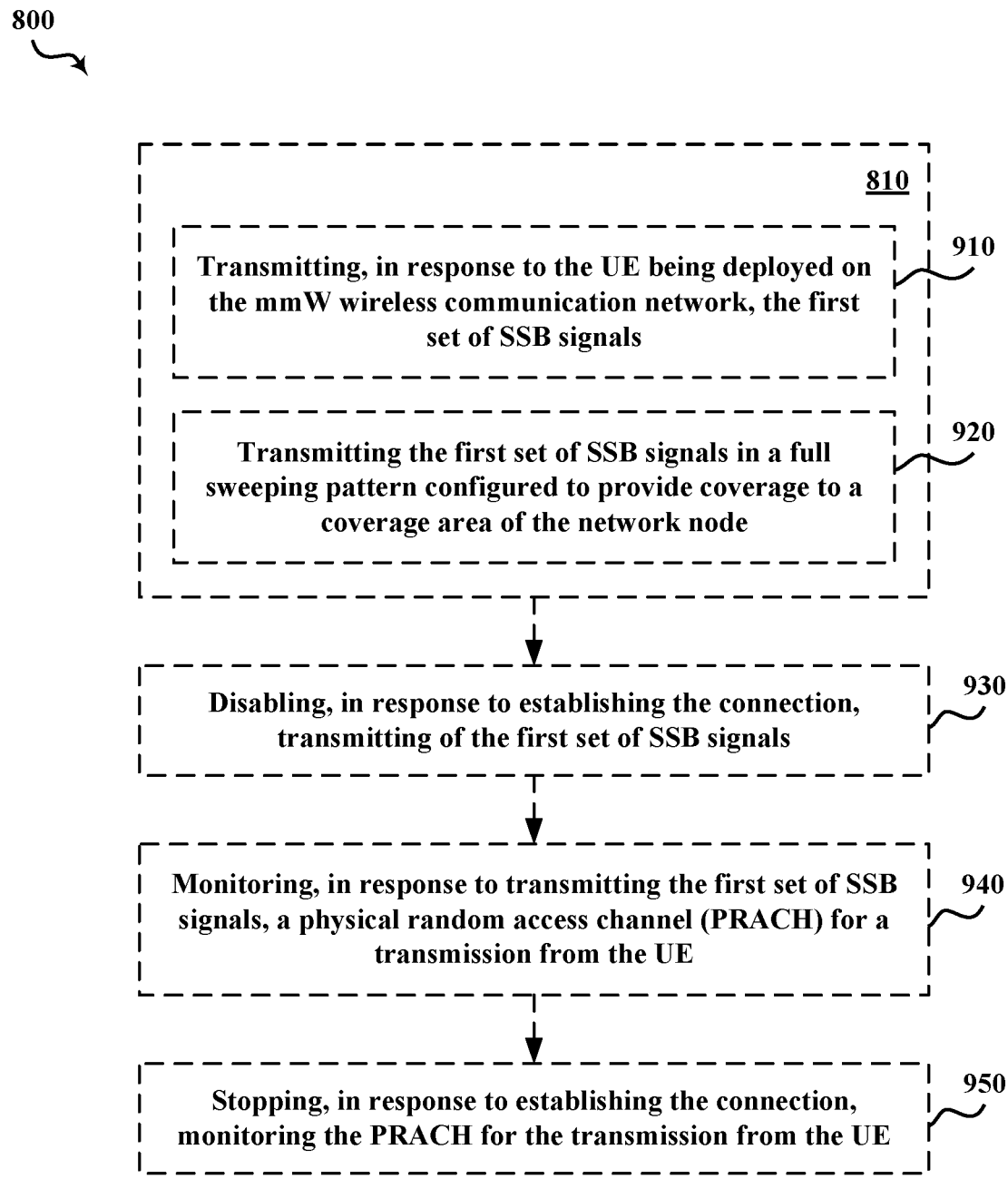
FIG. 9 is a flowchart of first additional or optional steps for the method of wireless communication by a base station of a fixed PTMP mmW wireless communication network, in accordance with various aspects of the present disclosure.

Referring to FIG. 9, in an optional or additional aspect that may be combined with any other aspect, at block 910, the transmitting, at block 810 of method 800, of the first set of SSB signals configured to establish a connection to the network with a UE comprises transmitting, in response to the UE being deployed on the network, the first set of SSB signals. For example, in an aspect, the base station 102, the BS PTMP access component 188, and/or the transmitting component 710 may be configured to or may comprise means for transmitting, in response to the UE 104 being deployed on the network, the first set of SSB signals.

For example, the transmitting at block 910 may include transmitting SSB bursts 504 using a pattern with a certain periodicity in response to an event, as described above in reference to FIG. 5. For example, the SSB bursts 504 may be transmitted in a manner that provides full SSB coverage of the coverage area of the base station 102.

Further, for example, the transmitting at block 910 may be performed to provide for the newly-deployed UE 104 to establish an initial connection with the base station 102.

In an optional or additional aspect that may be combined with any other aspect, at block 920, the transmitting, at block 810 of method 800, of the first set of SSB signals configured to establish a connection to the network with a UE comprises transmitting the first set of SSB signals in a full sweeping pattern configured to provide coverage to a coverage area of the network node. For example, in an aspect, the base station 102, the BS PTMP access component 188, and/or the transmitting component 710 may be configured to or may comprise means for transmitting the first set of SSB signals in a full sweeping pattern configured to provide coverage to a coverage area of the network node 102.

For example, the transmitting at block 920 may include transmitting SSB bursts 504 as described above in reference to FIG. 5. Alternatively or additionally, the transmitting at block 920 may include transmitting a first set of SSB signals 610, 660 using a low duty cycle, as described above in reference to FIG. 6.

Further, for example, the transmitting at block 920 may be performed to provide for a UE 104 to establish an initial connection with the base station 102. The SSB signals may be transmitted in response to an event and/or using a low duty cycle, thus allowing for providing full SSB coverage of the coverage area of the base station 102.

In an optional or additional aspect that may be combined with any other aspect, at block 930, the method 800 may include disabling, in response to establishing the connection, transmitting of the first set of SSB signals. For example, in an aspect, the base station 102, the BS PTMP access component 188, and/or the disabling component 730 may be configured to or may comprise means for disabling, in response to establishing the connection, transmitting of the first set of SSB signals.

For example, the disabling at block 930 may include stop transmitting SSB bursts 504 as described above in reference to FIG. 5.

Further, for example, the disabling at block 930 may be performed to free up resources used for transmitting the SSB bursts 504. Thus, potentially increasing efficiency and reducing power consumption of the base station 102.

In an optional or additional aspect that may be combined with any other aspect, at block 940, the method 800 may include monitoring, in response to transmitting the first set of SSB signals, a PRACH for a transmission from the UE. For example, in an aspect, the base station 102, the BS PTMP access component 188, and/or the monitoring component 740 may be configured to or may comprise means for monitoring, in response to transmitting the first set of SSB signals, a PRACH for a transmission from the UE 104.

For example, the monitoring at block 940 may include monitoring one or more ROs during which the UE 104 may transmit one or more transmissions to the base station 102 via the PRACH, as described above in reference to FIGS. 5 and 6A-6B.

In some aspects, the monitoring at block 940 may include receiving, from the UE 104 via the PRACH, one or more transmissions.

Further, for example, the monitoring at block 940 may be performed to receive, via the PRACH, one or more transmissions from the UE 104 requesting to establish an initial connection with the base station 102.

In this optional or additional aspect, at block 950, the method 800 may include stopping, in response to establishing the connection, monitoring the PRACH for the transmission from the UE. For example, in an aspect, the base station 102, the BS PTMP access component 188, and/or the stopping component 750 may be configured to or may comprise means for stopping, in response to establishing the connection, monitoring the PRACH for the transmission from the UE 104.

For example, the stopping at block 950 may include stop monitoring the PRACH in response to establishing a connection with the UE 104, as described above in reference to FIGS. 5 and 6A-6B.

In some aspects, the stopping at block 950 may include stop monitoring the PRACH in response to a determination that the PRACH transmission window 508 has elapsed, as described above in reference to FIG. 5.

Further, for example, the stopping at block 950 may be performed to free up resources used for monitoring and/or receiving transmissions via the PRACH. Thus, potentially increasing efficiency and reducing power consumption of the base station 102.

Figure 10:
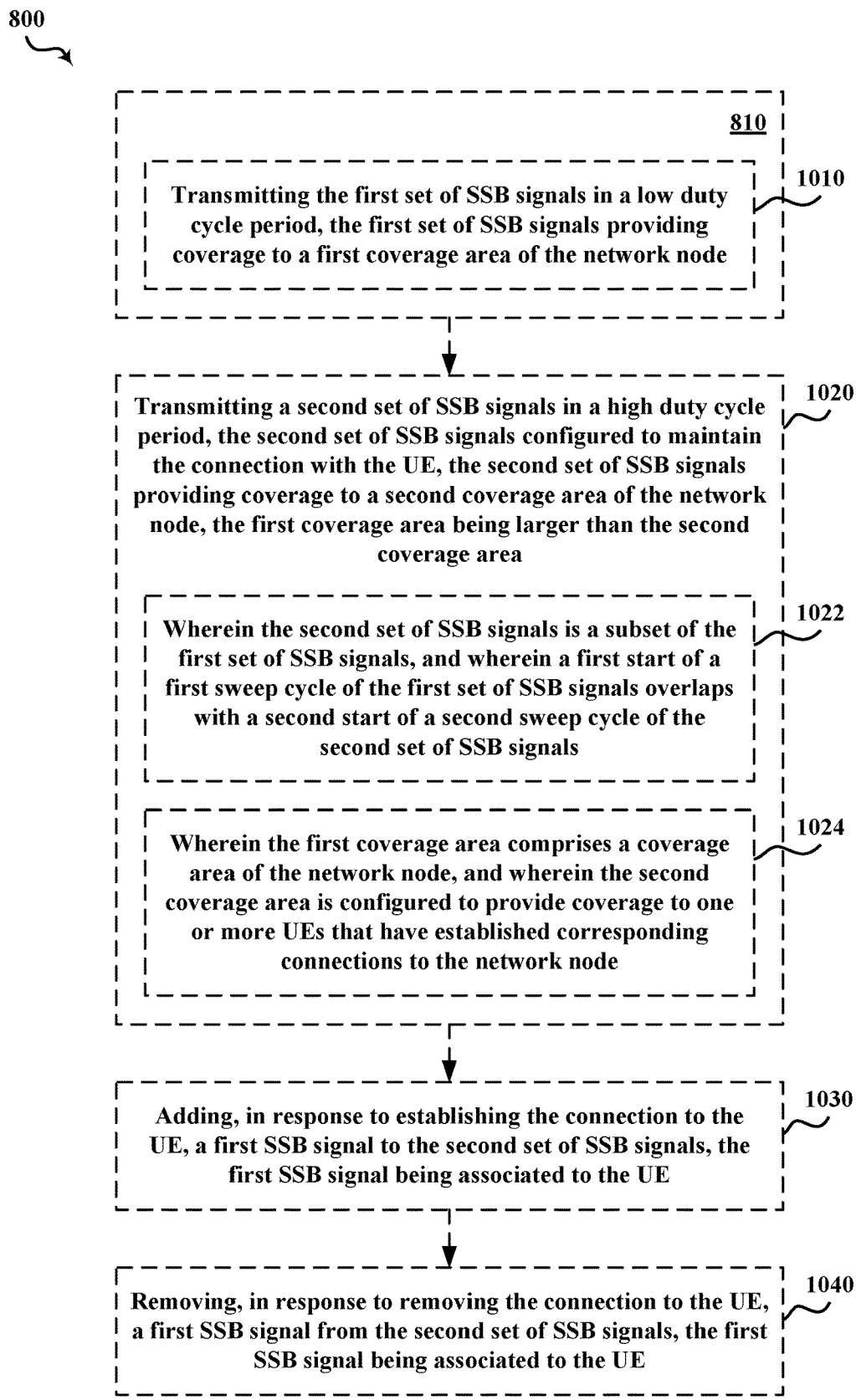
FIG. 10 is a flowchart of second additional or optional steps for the method of wireless communication by a base station of a fixed PTMP mmW wireless communication network, in accordance with various aspects of the present disclosure.

Referring to FIG. 10, in an optional or additional aspect that may be combined with any other aspect, at block 1010, the transmitting, at block 810 of method 800, of the first set of SSB signals configured to establish a connection to the network with a UE comprises transmitting the first set of SSB signals in a low duty cycle period, the first set of SSB signals providing coverage to a first coverage area of the network node. For example, in an aspect, the base station 102, the BS PTMP access component 188, and/or the transmitting component 710 may be configured to or may comprise means for transmitting the first set of SSB signals 610, 660 in a low duty cycle period, the first set of SSB signals 610, 660 providing coverage to a first coverage area of the network node 102.

For example, the transmitting at block 1010 may include transmitting the first set of SSB signals 610, 660 in a first SSB sweeping pattern, as described in reference to FIGS. 6A-6B.

Further, for example, the transmitting at block 1010 may be performed to provide for a UE 104 to synchronize to the network 100 and to establish an initial connection to the network node 102, without the need for operator intervention.

In an optional or additional aspect that may be combined with any other aspect, at block 1020, the method 800 may include transmitting a second set of SSB signals in a high duty cycle period, the second set of SSB signals configured to maintain the connection with the UE, the second set of SSB signals providing coverage to a second coverage area of the network node, the first coverage area being larger than the second coverage area. For example, in an aspect, the base station 102, the BS PTMP access component 188, and/or the transmitting component 710 may be configured to or may comprise means for transmitting a second set of SSB signals 620, 670 in a high duty cycle period, the second set of SSB signals 620, 670 configured to maintain the connection with the UE 104, the second set of SSB signals 620, 670 providing coverage to a second coverage area of the network node 102, the first coverage area being larger than the second coverage area.

For example, the transmitting at block 1020 may include transmitting the second set of SSB signals 620, 670 in a second SSB sweeping pattern, as described in reference to FIGS. 6A-6B.

Further, for example, the transmitting at block 1020 may be performed to provide for connected UEs 104 to maintain the corresponding connection to the base station 102.

In other optional or additional aspects, the transmitting at block 1020 may include, at sub-block 1022, that the second set of SSB signals is a subset of the first set of SSB signals, and that a first start of a first sweep cycle of the first set of SSB signals overlaps with a second start of a second sweep cycle of the second set of SSB signals.

In other optional or additional aspects, the transmitting at block 1020 may include, at sub-block 1024, that the first coverage area comprises a coverage area of the network node, and that the second coverage area is configured to provide coverage to one or more UEs that have established corresponding connections to the network node.

In an optional or additional aspect that may be combined with any other aspect, at block 1030, the method 800 may include adding, in response to establishing the connection to the UE, a first SSB signal to the second set of SSB signals, the first SSB signal being associated to the UE. For example, in an aspect, the base station 102, the BS PTMP access component 188, and/or the adding component 760 may be configured to or may comprise means for adding, in response to establishing the connection to the UE 104, a first SSB signal to the second set of SSB signals 620, 670, the first SSB signal being associated to the UE 104.

For example, the adding at block 1030 may include adding an SSB signal corresponding to the UE 104 to the second set of SSB signals 620, 670 in response to establishing a connection with the UE 104, as described above in reference to FIGS. 6A-6B.

Further, for example, the adding at block 1030 may be performed to provide SSB coverage from the second set of SSB signals 620, 670 to the UE 104.

In an optional or additional aspect that may be combined with any other aspect, at block 1040, the method 800 may include removing, in response to removing the connection to the UE, a first SSB signal from the second set of SSB signals, the first SSB signal being associated to the UE. For example, in an aspect, the base station 102, the BS PTMP access component 188, and/or the removing component 770 may be configured to or may comprise means for removing, in response to removing the connection to the UE 104, a first SSB signal from the second set of SSB signals, the first SSB signal being associated to the UE 104.

For example, the removing at block 1040 may include removing the SSB signal corresponding to the UE 104 from the second set of SSB signals 620, 670 in response to removing the connection with the UE 104, as described above in reference to FIGS. 6A-6B.

Further, for example, the removing at block 1040 may be performed to stop transmitting the SSB signal corresponding to the disconnected UE 104. Thus, freeing up resources used for transmitting the SSB signal, and, as such, potentially increasing efficiency and reducing power consumption of the base station 102.

Figure 11:
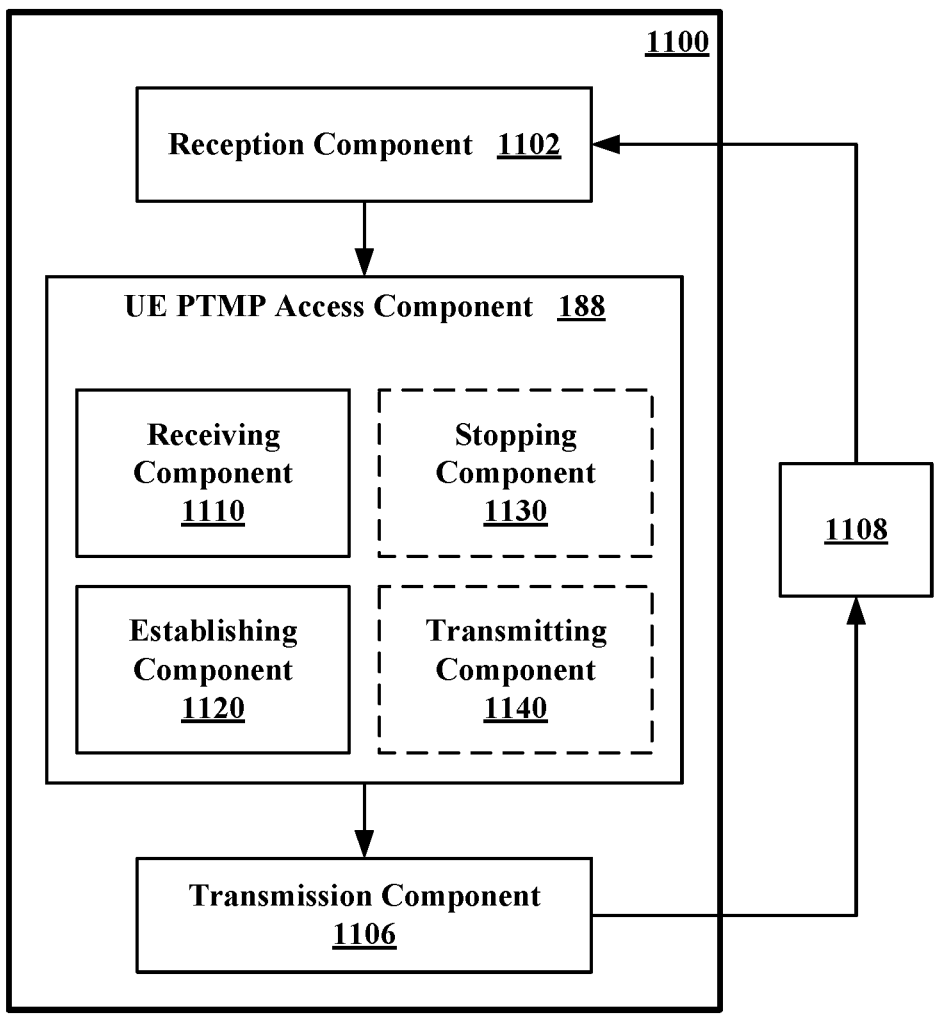
FIG. 11 is a diagram illustrating an example apparatus, such as a user equipment (UE), for wireless communication in a fixed PTMP mmW wireless communication network, in accordance with various aspects of the present disclosure.

FIG. 11 is a block diagram of an example apparatus 1100 for wireless communication in a fixed point-to-multipoint (PTMP) millimeter-wave (mmW) wireless communication network. The apparatus 1100 may be a UE 104 (e.g., UE 104 of FIGS. 1 and 3) or a UE 104 may include the apparatus 1100. In some aspects, the apparatus 1100 may include a reception component 1102 configured to receive wireless communications from another apparatus (e.g., apparatus 1108), a UE PTMP access component 198 configured to establish and maintain connections of a fixed PTMP mmW wireless communication network, a transmission component 1106 configured to transmit wireless communications to another apparatus (e.g., apparatus 1108), and which may be in communication with one another (e.g., via buses or electrical connections). As shown, the apparatus 1100 may be in communication with another apparatus 1108 (such as a base station 102, or another wireless communication device) using the reception component 1102 and the transmission component 1106.

In some aspects, the apparatus 1100 may be configured to perform one or more operations described herein in connection with FIGS. 1 and 3-6. Alternatively or additionally, the apparatus 1100 may be configured to perform one or more processes described herein, such as method 1200 of FIG. 12. In some aspects, the apparatus 1100 may include one or more components of the UE 104 described above in connection with FIGS. 1 and 3.

The reception component 1102 may receive communications, such as reference signals, control information, data communications, or a combination thereof, from the apparatus 1108. The reception component 1102 may provide received communications to one or more other components of the apparatus 1100, such as the UE PTMP access component 198. In some aspects, the reception component 1102 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the UE 104 described above in connection with FIGS. 1 and 3.

The transmission component 1106 may transmit communications, such as reference signals, control information, data communications, or a combination thereof, to the apparatus 1108. In some aspects, the UE PTMP access component 198 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In other aspects, the transmission component 1106 may include one or more antennas, a modulator, a transmit MIMO processor, a transmit processor, a controller/processor, a memory, or a combination thereof, of the UE 104 described above in connection with FIGS. 1 and 3. In some aspects, the transmission component 1106 may be co-located with the reception component 1102 in a transceiver or transceiver component.

The UE PTMP access component 198 may be configured to establish and maintain connections of a fixed PTMP mmW wireless communication network. In some aspects, the UE PTMP access component 198 may include a set of components, such as a receiving component 1110 configured to receive at least one SSB signal of a first set of SSB signals, and an establishing component 1120 configured to establish a connection to the network with a network node 102 using information comprised by the at least one SSB signal.

In other optional or additional aspects, the BS PTMP access component 188 may include a stopping component 1130 configured to stop monitoring for an additional SSB signal of the first set of SSB signals, and a transmitting component 1140 configured to transmit a transmission to the network node 102.

Alternatively or additionally, the set of components may be separate and distinct from the UE PTMP access component 198. In other aspects, one or more components of the set of components may include or may be implemented within a controller/processor (e.g., the TX processor 356, the RX processor 353, the controller/processor 355), a memory (e.g., the memory 357), or a combination thereof, of the UE 104 described in FIGS. 1 and 3. Alternatively or additionally, one or more components of the set of components may be implemented at least in part as software stored in a memory, such as the memory 357. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIGS. 1 and 3.

Figure 12:
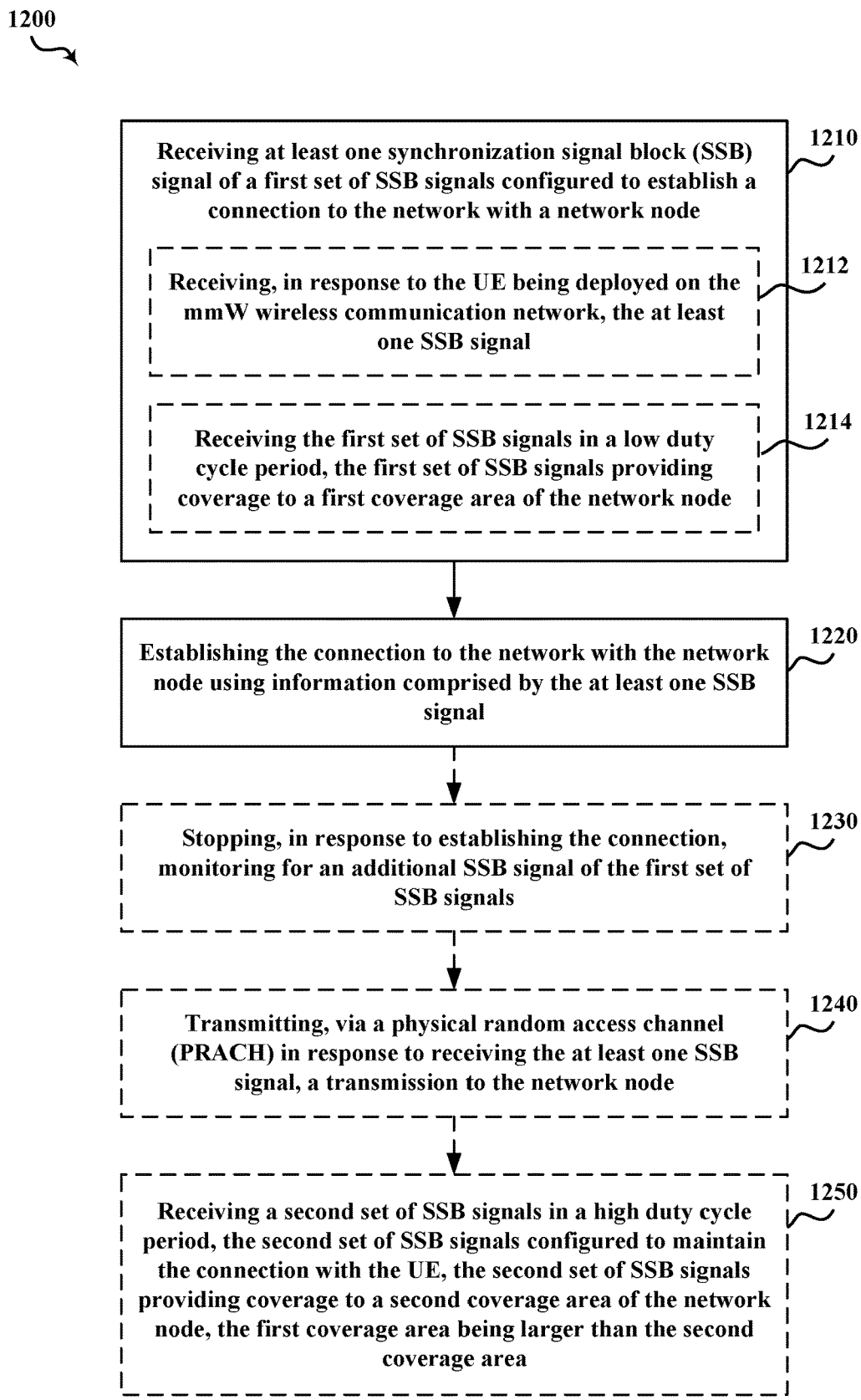
FIG. 12 is a flowchart of a method of wireless communication by a UE of a fixed PTMP mmW wireless communication network, in accordance with various aspects of the present disclosure.

Referring to FIGS. 11-12, in operation, an apparatus 1100 may perform a method 1200 of wireless communication at a UE. Alternatively or additionally, the method 1200 may be performed by the UE 104 (which may include the memory 357 and which may be the entire UE 104 and/or one or more components of the UE 104 such as the UE PTMP access component 198, the TX processor 356, the RX processor 353, and/or the controller/processor 355). The method 1200 may be performed by the UE PTMP access component 198 in communication with the apparatus 1108 (e.g., base station 102).

At block 1210 of FIG. 12, the method 1200 includes receiving at least one SSB signal of a first set of SSB signals configured to establish a connection to the network with a network node. For example, in an aspect, the UE 104, the UE PTMP access component 198, and/or the receiving component 1110 may be configured to or may comprise means for receiving at least one SSB signal of a first set of SSB signals configured to establish a connection to the network 100 with a network node 102.

For example, the receiving at block 1210 may include receiving at least one SSB signal of an SSB burst 504. The SSB burst having been transmitted using a sweeping pattern with a certain periodicity in response to an event, as described above in reference to FIG. 5. Alternatively or additionally, the receiving at block 1210 may include receiving at least one SSB signal of a first set of SSB signals 610, 660 having been transmitted using a low duty cycle, as described above in reference to FIG. 6.

In some aspects, the receiving at block 1210 may include receiving at least one RMSI block (e.g., SIB1), as described above in reference to FIGS. 5 and 6A-6B. For example, the RMSI blocks may indicate one or more RACH occasions (ROs) during which the UE 104 may transmit one or more transmissions to the base station 102 via the PRACH.

Further, for example, the receiving at block 1210 may be performed to obtain configuration information to establish an initial connection with the base station 102.

In other optional or additional aspects, the receiving at block 1210 may include, at sub-block 1212, receiving, in response to the UE being deployed on the network, the at least one SSB signal.

In other optional or additional aspects, the receiving at block 1210 may include, at sub-block 1214, receiving the first set of SSB signals in a low duty cycle period, the first set of SSB signals providing coverage to a first coverage area of the network node.

At block 1220 of FIG. 12, the method 1200 includes establishing the connection to the network with the network node using information comprised by the at least one SSB signal. For example, in an aspect, the UE 104, the UE PTMP access component 198, and/or the establishing component 1120 may be configured to or may comprise means for establishing the connection to the network 100 with the network node 102 using information comprised by the at least one SSB signal.

For example, the establishing at block 1220 may include establishing a connection with the base station 102 using information comprised by a SSB signal of the first set of SSB signals received by the UE 104, as described above in reference to block 1210.

In some aspects, the establishing at block 1220 may include transmitting, to the base station 102 via the PRACH, one or more transmissions requesting to establish an initial connection with the base station 102, according to the RO corresponding to the SSB signal received by the UE 104.

Further, for example, the establishing at block 1220 may be performed to establish an initial connection between the base station 102 and the UE 104.

At block 1230 of FIG. 12, the method 1200 may optionally include stopping, in response to establishing the connection, monitoring for an additional SSB signal of the first set of SSB signals. For example, in an aspect, the UE 104, the UE PTMP access component 198, and/or the stopping component 1130 may be configured to or may comprise means for stopping, in response to establishing the connection, monitoring for an additional SSB signal of the first set of SSB signals.

For example, the stopping at block 1230 may include stop monitoring for SSB bursts 504 as described above in reference to FIG. 5.

Further, for example, the stopping at block 1230 may be performed to free up resources used for monitoring the SSB bursts 504. Thus, potentially increasing efficiency and reducing power consumption of the UE 104.

At block 1240 of FIG. 12, the method 1200 may optionally include transmitting, via a PRACH in response to receiving the at least one SSB signal, a transmission to the network node. For example, in an aspect, the UE 104, the UE PTMP access component 198, and/or the transmitting component 1140 may be configured to or may comprise means for transmitting, via a PRACH in response to receiving the at least one SSB signal, a transmission to the network node 102.

For example, the transmitting at block 1240 may include a transmission requesting to establishing a connection with the network node 102, as described above in reference to FIGS. 5 and 6A-6B. In some aspects, the transmission may be transmitted during a RACH occasion corresponding to the SSB signal received by the UE 104.

Further, for example, the transmitting at block 1240 may be performed to establish an initial connection between the base station 102 and the UE 104.

At block 1250 of FIG. 12, the method 1200 may optionally include receiving a second set of SSB signals in a high duty cycle period, the second set of SSB signals configured to maintain the connection with the UE, the second set of SSB signals providing coverage to a second coverage area of the network node, the first coverage area being larger than the second coverage area. For example, in an aspect, the UE 104, the UE PTMP access component 198, and/or the receiving component 1110 may be configured to or may comprise means for receiving a second set of SSB signals in a high duty cycle period, the second set of SSB signals configured to maintain the connection with the UE 104, the second set of SSB signals providing coverage to a second coverage area of the network node 102, the first coverage area being larger than the second coverage area.

For example, the receiving at block 1250 may include receiving the second set of SSB signals 620, 670 in a second SSB sweeping pattern, as described in reference to FIGS. 6A-6B.

Further, for example, the receiving at block 1250 may be performed to provide for the UE 104 to maintain the connection to the base station 102.

In other optional or additional aspects, the receiving at block 1250 may include that the second set of SSB signals is a subset of the first set of SSB signals, and that a first start of a first sweep cycle of the first set of SSB signals overlaps with a second start of a second sweep cycle of the second set of SSB signals.

In other optional or additional aspects, the receiving at block 1250 may include that the first coverage area comprises a coverage area of the network node, and that the second coverage area is configured to provide coverage to one or more UEs that have established corresponding connections to the network node.

Implementation examples are described in the following numbered clauses:

1. A method of wireless communication by a network node of a fixed PTMP mmW wireless communication network, comprising:
    transmitting a first set of SSB signals configured to establish a connection to the network with a UE; and
    establishing the connection to the network with the UE using information comprised by a SSB signal of the first set of SSB signals received by the UE.

2. The method of clause 1,
    wherein transmitting the first set of SSB signals comprises transmitting, in response to the UE being deployed on the network, the first set of SSB signals; and
    wherein the method further comprises disabling, in response to establishing the connection, transmitting of the first set of SSB signals.

3. The method of clause 1 or 2, wherein transmitting the first set of SSB signals comprises transmitting the first set of SSB signals in a full sweeping pattern configured to provide coverage to a coverage area of the network node.

4. The method of any preceding clause 1 to 3, further comprising:
    monitoring, in response to transmitting the first set of SSB signals, a PRACH for a transmission from the UE; and
    stopping, in response to establishing the connection, monitoring the PRACH for the transmission from the UE.

5. The method of any preceding clause 1 to 4,
    wherein transmitting the first set of SSB signals comprises transmitting the first set of SSB signals in a low duty cycle period, the first set of SSB signals providing coverage to a first coverage area of the network node; and
    wherein the method further comprises transmitting a second set of SSB signals in a high duty cycle period, the second set of SSB signals configured to maintain the connection with the UE, the second set of SSB signals providing coverage to a second coverage area of the network node, the first coverage area being larger than the second coverage area.

6. The method of any preceding clause 1 to 5, wherein the second set of SSB signals is a subset of the first set of SSB signals, and wherein a first start of a first sweep cycle of the first set of SSB signals overlaps with a second start of a second sweep cycle of the second set of SSB signals.

7. The method of any preceding clause 1 to 6, wherein the first coverage area comprises a coverage area of the network node, and wherein the second coverage area is configured to provide coverage to one or more UEs that have established corresponding connections to the network node.

8. The method of any preceding clause 1 to 7, further comprising:
    adding, in response to establishing the connection to the UE, a first SSB signal to the second set of SSB signals, the first SSB signal being associated to the UE.

9. The method of any preceding clause 1 to 8, further comprising:
    removing, in response to removing the connection to the UE, a first SSB signal from the second set of SSB signals, the first SSB signal being associated to the UE.

10. An apparatus for wireless communication by a network node of a fixed PTMP mmW wireless communication network, comprising a memory storing instructions, and a processor communicatively coupled with the memory and configured to execute the instructions to perform one or more methods of any preceding clause 1 to 9.

11. An apparatus for wireless communication by a network node of a fixed PTMP mmW wireless communication network, comprising means for performing one or more methods of any preceding clause 1 to 9.

12. A computer-readable medium storing instructions of wireless communication by a network node of a fixed PTMP mmW wireless communication network, executable by a processor, to perform one or more methods of any preceding clause 1 to 9.

13. A method of wireless communication by a UE of a fixed PTMP mmW wireless communication network, comprising:
receiving at least one synchronization signal block (SSB) signal of a first set of SSB signals configured to establish a connection to the network with a network node; and establishing the connection to the network with the network node using information comprised by the at least one SSB signal.

14. The method of clause 13,
wherein receiving the at least one SSB signal comprises receiving, in response to the UE being deployed on the network, the at least one SSB signal; and
wherein the method further comprises stopping, in response to establishing the connection, monitoring for an additional SSB signal of the first set of SSB signals.

15. The method of clause 13 or 14, further comprising:
transmitting, via a PRACH in response to receiving the at least one SSB signal, a transmission to the network node.

16. The method of any preceding clause 13 to 15,
wherein receiving the at least one SSB signal comprises receiving the first set of SSB signals in a low duty cycle period, the first set of SSB signals providing coverage to a first coverage area of the network node; and
wherein the method further comprises receiving a second set of SSB signals in a high duty cycle period, the second set of SSB signals configured to maintain the connection with the UE, the second set of SSB signals providing coverage to a second coverage area of the network node, the first coverage area being larger than the second coverage area.

17. The method of any preceding clause 13 to 16, wherein the second set of SSB signals is a subset of the first set of SSB signals, and wherein a first start of a first sweep cycle of the first set of SSB signals overlaps with a second start of a second sweep cycle of the second set of SSB signals.

18. The method of any preceding clause 13 to 17, wherein the first coverage area comprises a coverage area of the network node, and wherein the second coverage area is configured to provide coverage to one or more UEs that have established corresponding connections to the network node.

19. An apparatus for wireless communication by a UE of a fixed PTMP mmW wireless communication network, comprising a memory storing instructions, and a processor communicatively coupled with the memory and configured to execute the instructions to perform one or more methods of any preceding clause 13 to 18.

20. An apparatus for wireless communication by a UE of a fixed PTMP mmW wireless communication network, comprising means for performing one or more methods of any preceding clause 13 to 18.

21. A computer-readable medium storing instructions of wireless communication by a UE of a fixed PTMP mmW wireless communication network, executable by a processor, to perform one or more methods of any preceding clause 13 to 18.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. An apparatus for wireless communication by a network node of a fixed point-to-multipoint (PTMP) millimeter-wave (mmW) wireless communication network, comprising:
a memory storing instructions; and one or more processors communicatively coupled with the memory and configured to execute the instructions to:
- transmit a first set of synchronization signal block (SSB) signals in a low duty cycle period, the first set of SSB signals providing coverage to a first coverage area of the network node and configured to establish a connection to the fixed PTMP mmW wireless communication network with a user equipment (UE);
- transmit a second set of SSB signals in a high duty cycle period, the second set of SSB signals configured to maintain the connection with the UE, the second set of SSB signals providing coverage to a second coverage area of the network node, the first coverage area being larger than the second coverage area; and
- establish the connection to the fixed PTMP mmW wireless communication network with the UE using information comprised by a SSB signal of the first set of SSB signals received by the UE.

2. The apparatus of claim 1, wherein the second set of SSB signals is a subset of the first set of SSB signals, and wherein a first start of a first sweep cycle of the first set of SSB signals overlaps with a second start of a second sweep cycle of the second set of SSB signals.

3. The apparatus of claim 1, wherein the first coverage area comprises a coverage area of the network node, and wherein the second coverage area is configured to provide coverage to one or more UEs that have established corresponding connections to the network node.

4. The apparatus of claim 1, wherein the one or more processors are further configured to execute the instructions to:
- add, in response to establishing the connection to the UE, a first SSB signal to the second set of SSB signals, the first SSB signal being associated to the UE.

5. The apparatus of claim 1, wherein the one or more processors are further configured to execute the instructions to:
- remove, in response to removing the connection to the UE, a first SSB signal from the second set of SSB signals, the first SSB signal being associated to the UE.

6. An apparatus for wireless communication by a user equipment (UE) of a fixed point-to-multipoint (PTMP) millimeter-wave (mmW) wireless communication network, comprising:
- a memory storing instructions; and
- one or more processors communicatively coupled with the memory and configured to execute the instructions to:
  - receive at least one synchronization signal block (SSB) signal of a first set of SSB signals in a low duty cycle period, the first set of SSB signals providing coverage to a first coverage area of a network node and configured to establish a connection to the fixed PTMP mmW wireless communication network with the network node;
  - receive a second set of SSB signals in a high duty cycle period, the second set of SSB signals configured to maintain the connection with the UE, the second set of SSB signals providing coverage to a second coverage area of the network node, the first coverage area being larger than the second coverage area; and
  - establish the connection to the fixed PTMP mmW wireless communication network with the network node using information comprised by the at least one SSB signal.

7. The apparatus of claim 6, wherein the second set of SSB signals is a subset of the first set of SSB signals, and wherein a first start of a first sweep cycle of the first set of SSB signals overlaps with a second start of a second sweep cycle of the second set of SSB signals.

8. The apparatus of claim 6, wherein the first coverage area comprises a coverage area of the network node, and wherein the second coverage area is configured to provide coverage to one or more UEs that have established corresponding connections to the network node.

9. A method for wireless communication by a network node of a fixed point-to-multipoint (PTMP) millimeter-wave (mmW) wireless communication network, comprising:
- transmitting a first set of synchronization signal block (SSB) signals in a low duty cycle period, the first set of SSB signals providing coverage to a first coverage area of the network node and configured to establish a connection to the fixed PTMP mmW wireless communication network with a user equipment (UE);
- transmitting a second set of SSB signals in a high duty cycle period, the second set of SSB signals configured to maintain the connection with the UE, the second set of SSB signals providing coverage to a second coverage area of the network node, the first coverage area being larger than the second coverage area; and
- establishing the connection to the fixed PTMP mmW wireless communication network with the UE using information comprised by a SSB signal of the first set of SSB signals received by the UE.

10. The method of claim 9, wherein the second set of SSB signals is a subset of the first set of SSB signals, and wherein a first start of a first sweep cycle of the first set of SSB signals overlaps with a second start of a second sweep cycle of the second set of SSB signals.

11. The method of claim 9, wherein the first coverage area comprises a coverage area of the network node, and wherein the second coverage area is configured to provide coverage to one or more UEs that have established corresponding connections to the network node.

12. The method of claim 9, wherein the method comprises:
- adding, in response to establishing the connection to the UE, a first SSB signal to the second set of SSB signals, the first SSB signal being associated to the UE.

13. The method of claim 9, wherein the method comprises:
- removing, in response to removing the connection to the UE, a first SSB signal from the second set of SSB signals, the first SSB signal being associated to the UE.

14. A method for wireless communication by a user equipment (UE) of a fixed point-to-multipoint (PTMP) millimeter-wave (mmW) wireless communication network, comprising:
- receiving at least one synchronization signal block (SSB) signal of a first set of SSB signals in a low duty cycle period, the first set of SSB signals providing coverage to a first coverage area of a network node and configured to establish a connection to the fixed PTMP mmW wireless communication network with the network node;
- receiving a second set of SSB signals in a high duty cycle period, the second set of SSB signals configured to maintain the connection with the UE, the second set of SSB signals providing coverage to a second coverage area of the network node, the first coverage area being larger than the second coverage area; and establishing the connection to the fixed PTMP mmW wireless communication network with the network node using information comprised by the at least one SSB signal.

15. The method of claim 14, wherein the second set of SSB signals is a subset of the first set of SSB signals, and wherein a first start of a first sweep cycle of the first set of SSB signals overlaps with a second start of a second sweep cycle of the second set of SSB signals.

16. The method of claim 14, wherein the first coverage area comprises a coverage area of the network node, and wherein the second coverage area is configured to provide coverage to one or more UEs that have established corresponding connections to the network node.

* * * * *